United States Patent [19]
Brayton

[11] 3,730,625
[45] May 1, 1973

[54] LASER VELOCIMETER EMPLOYING REFERENCE BEAM DETECTION

[75] Inventor: Donald B. Brayton, Tullahoma, Tenn.

[73] Assignee: The United States of America as represented by the Air Force

[22] Filed: Feb. 26, 1971

[21] Appl. No.: 119,322

[52] U.S. Cl.....................................356/28, 350/285
[51] Int. Cl..............................................G01p 3/36
[58] Field of Search........................356/28, 111, 113; 350/285

[56] References Cited

UNITED STATES PATENTS 3,548,655   12/1970   Rudd......................................356/28

FOREIGN PATENTS OR APPLICATIONS 342,219   1/1931   Great Britain........................356/106

OTHER PUBLICATIONS

Brayton et al., "Proc. 16th Intrntl. Aerospace Instr. Symposium," May 11–13, 1970, pp. 14–26.

*Primary Examiner*—Robert F. Stahl
*Assistant Examiner*—S. C. Buczinski
*Attorney*—Harry A. Herbert, Jr. and Willard R. Matthews, Jr.

[57] ABSTRACT

A doppler shift laser velocimeter is disclosed that employs a self-aligning optical system capable of determining one or more velocity components of a moving substance. The beam from a plane polarized laser source is automatically split into two or more plane polarized parallel beams by one or more parallel surface glass blocks. These beams are then directed onto a focusing element which automatically focuses them to a common point P in space. One or more velocity components of a moving substance are detected by placing photodetectors in the paths of one or more of the beams after they have traversed through or reflected from the moving substance near the common point P. Means are connected to the outputs of the photodetectors for determining the frequencies of the electrical signals. These frequencies are proportional to the specific velocity components of the moving substance.

3 Claims, 52 Drawing Figures

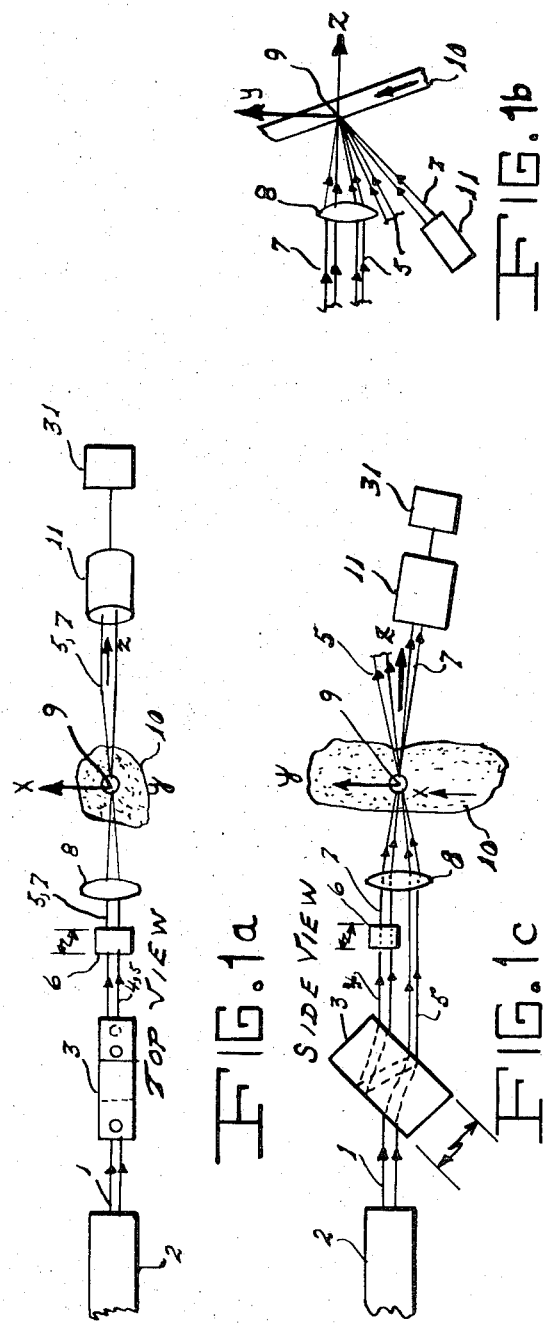
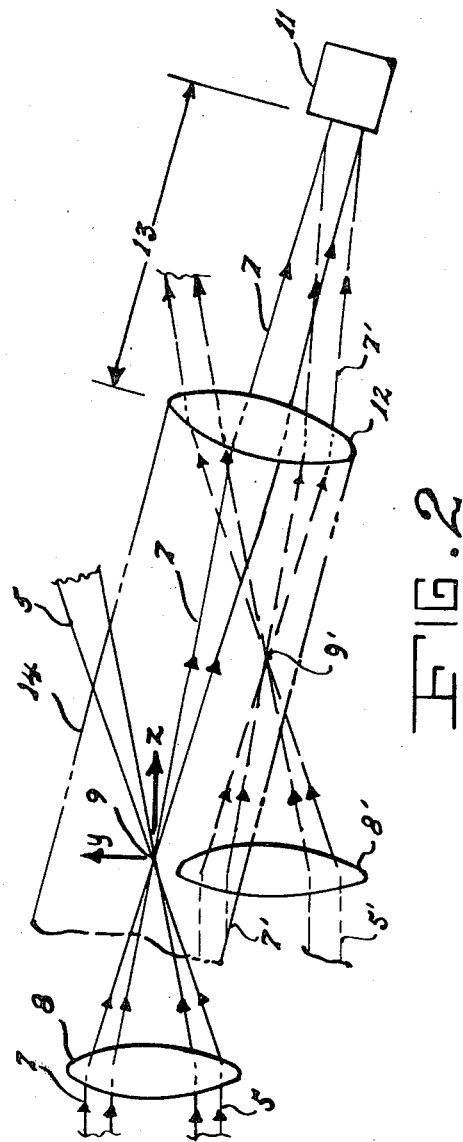

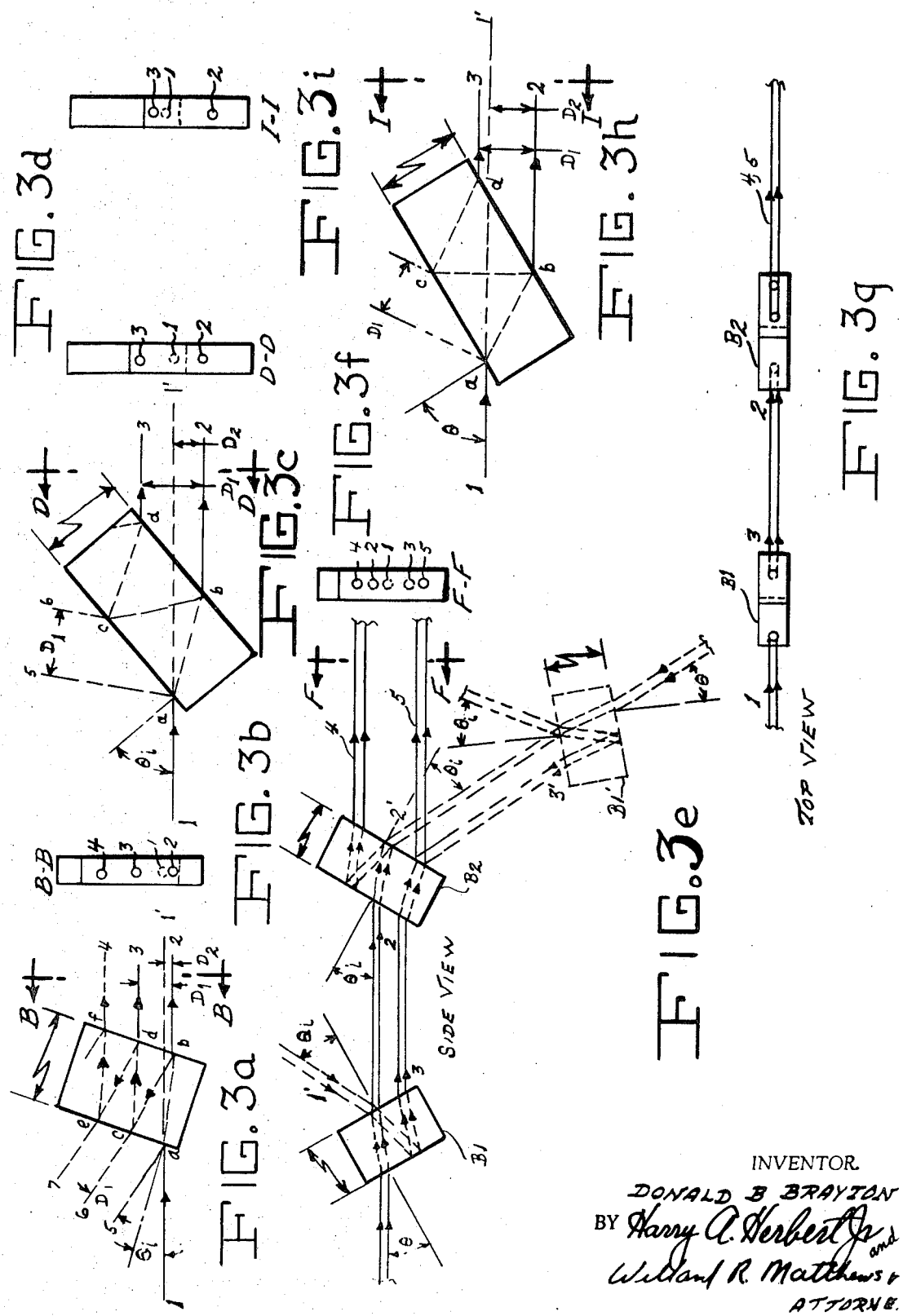

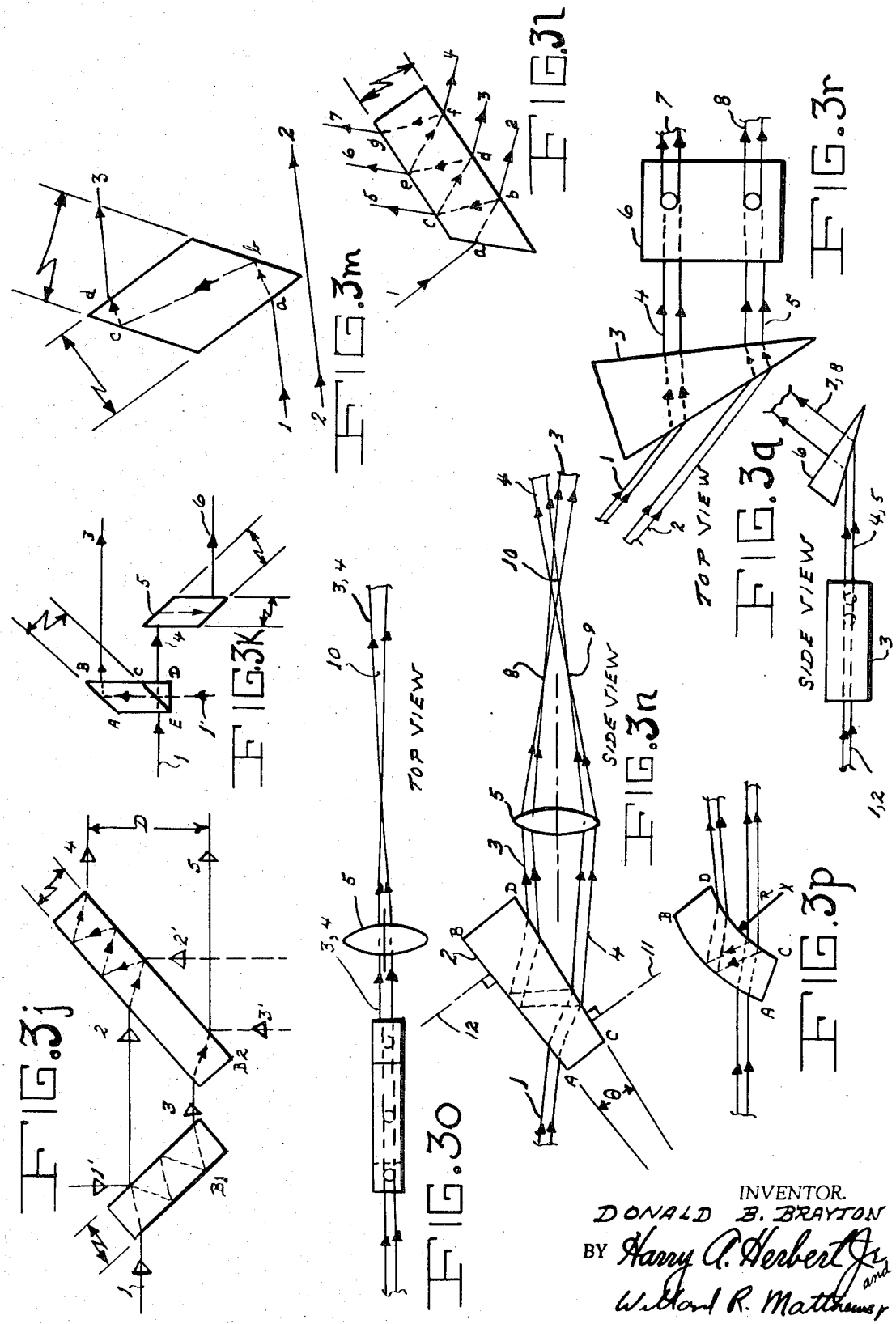

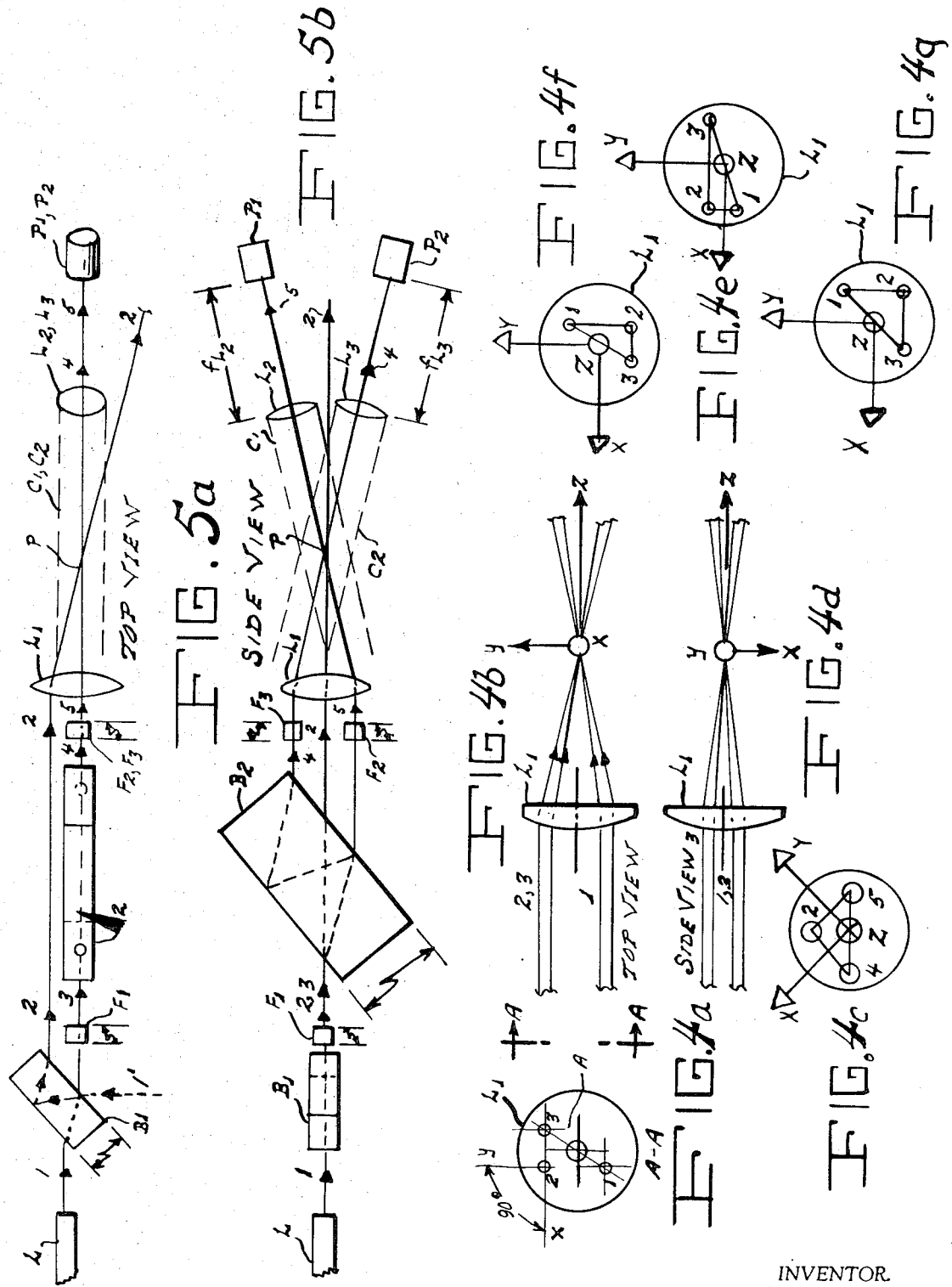

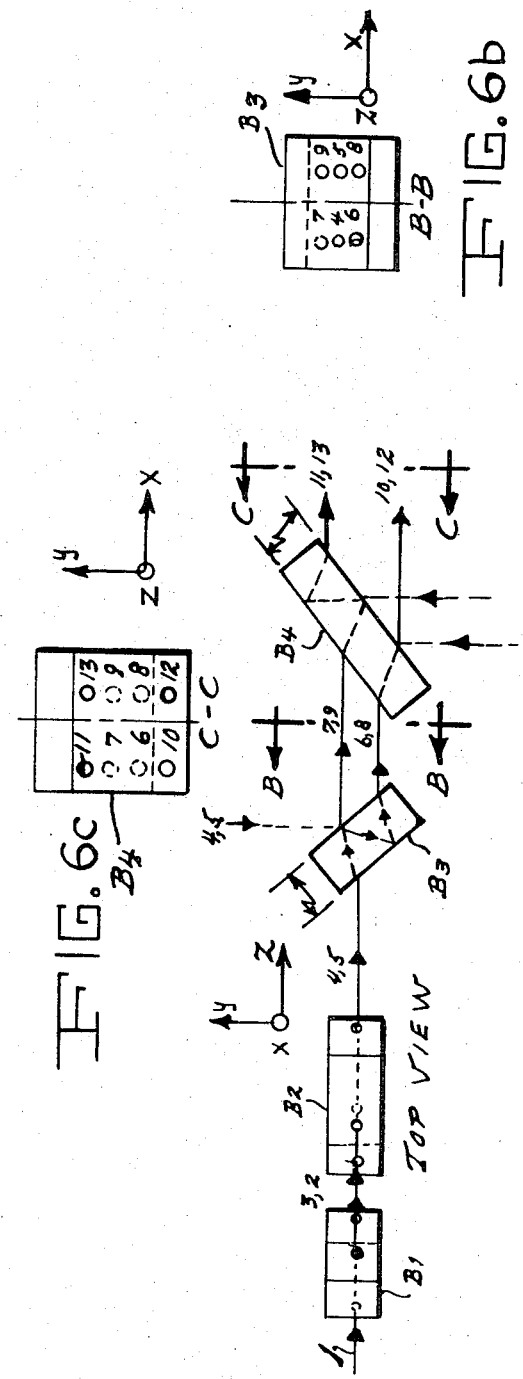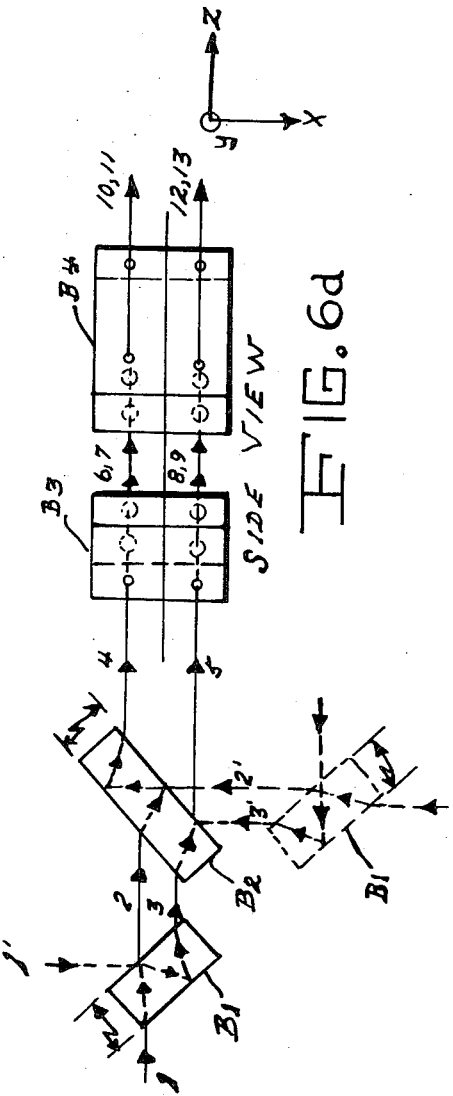

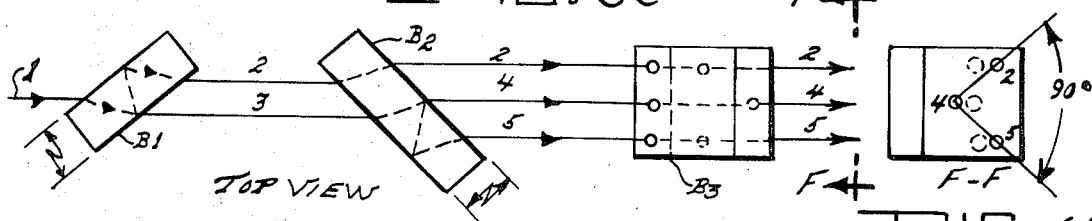
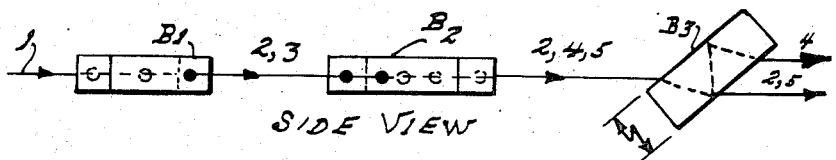
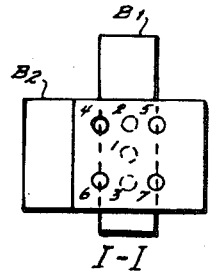
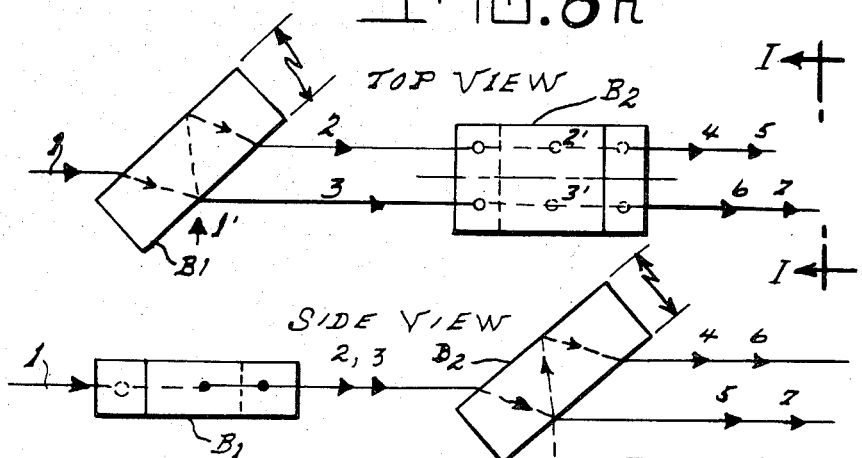
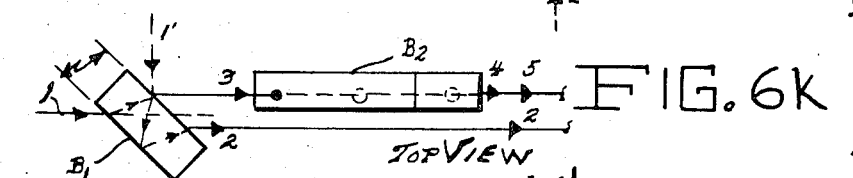
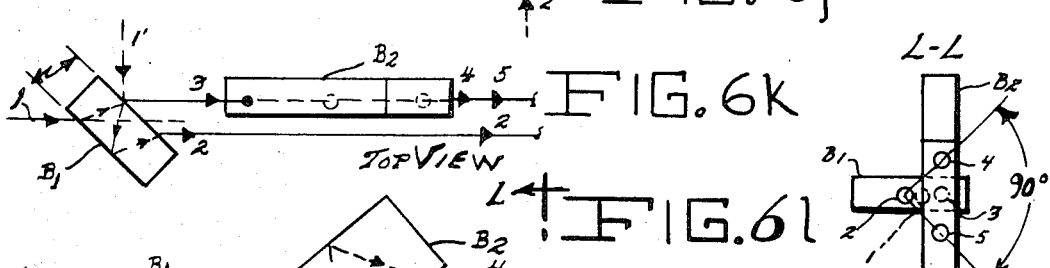
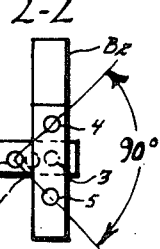
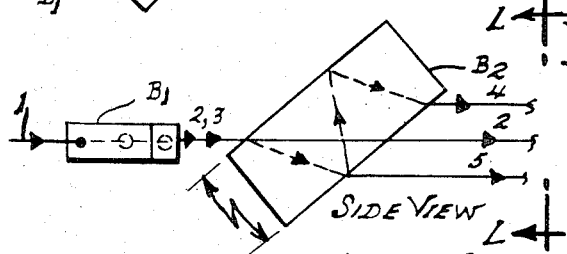

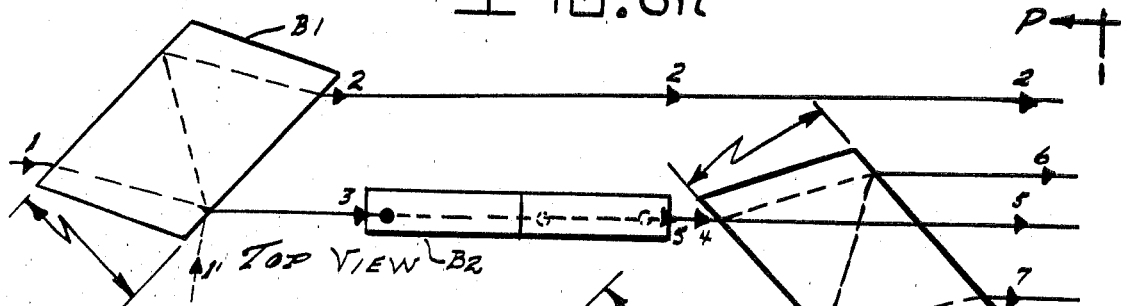
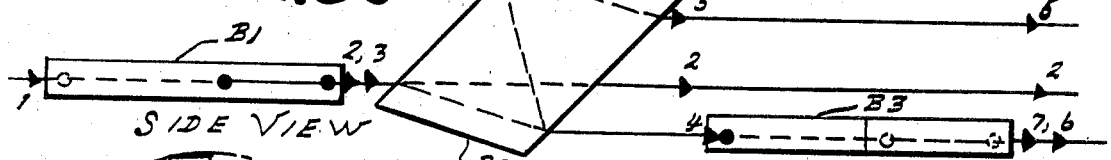
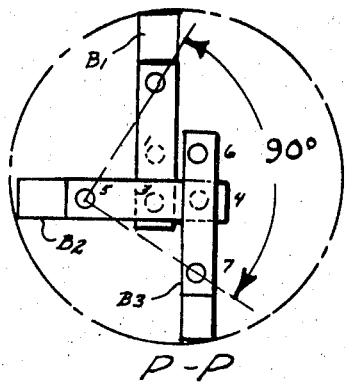
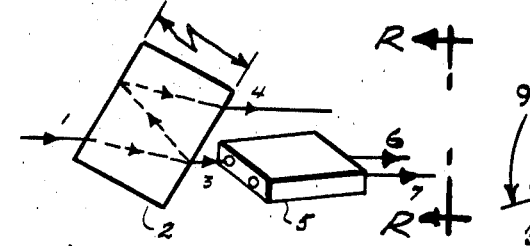
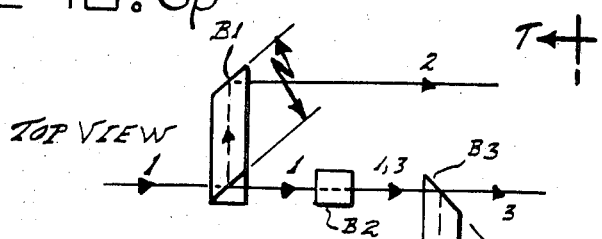
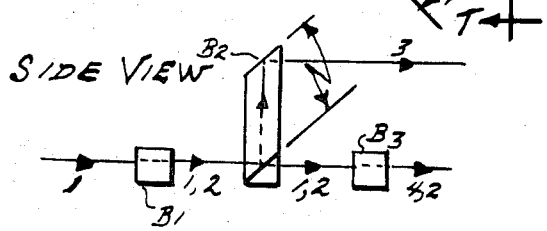
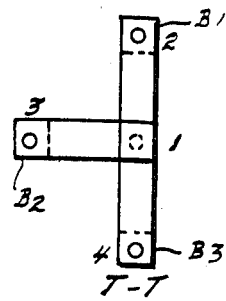

LASER VELOCIMETER EMPLOYING REFERENCE BEAM DETECTION

BACKGROUND OF THE INVENTION

The present invention relates generally to a method and means for measuring the velocity of a moving substance, and more specifically comprehends a method of and apparatus for simultaneously measuring one or more velocity components of a moving substance at a common detection point.

Velocity component measurements of a moving substance have in the past commonly been made by mechanical devices. Such measurements are made, for example, to investigate lamina and turbulent fluid flows, boundary layers and shock waves and to acquire frequency and vibration information on a moving surface. It has been found that these and other velocity components measurement applications can be better achieved by the use of laser measuring systems. One primary advantage of using a laser for velocity measurements is that it produces essentially no disturbance in the fluid flow as do mechanical devices. Also, the laser velocimeter overcomes various other disadvantages of mechanical devices: it provides direct measurement without need for further computation and correction factors; it provides instant response to measure transient data; it has the ability to measure very close to the surface of a test object; it is indifferent to highly energetic plasma flow fields; and it has the ability to be used in otherwise inaccessible places. Currently available laser velocimeters, however, require precise alignment of two or more light beams and the maintaining of intercepting beams at a spot in space coinciding with the target or substance being investigated. Vibrations, inadvertent jarring of system components, or any similar occurrence, results in misalignment and consequent misfunction of the device. Furthermore, setting the device up and maintaining precise beam control requires much time and a trained skilled operator. The present invention is directed toward overcoming these and other deficiencies and problems common to currently available devices of this type.

SUMMARY OF THE INVENTION

One embodiment of the invention that provides single velocity components measuring includes a quasi monochromatic laser source that projects a plane polarized collimated light input beam into a beam splitting means. The beam splitting means splits the input beam into two beams, a reference beam and a signal beam, that are linearly polarized in a common direction and that propagate parallel to each other. The reference beam intensity is adjusted for optimum performance by passing it through an intensity filter. A focusing element transforms the planar wave front radiation of the reference beam and the high power unfiltered signal beam into a converging set of output rays (spheroid wavefront radiation) that focus at a common point (the point at which velocity component measurements are taken). A photodetector is positioned to receive the direct transmitted or reflected radiation of the reference beam. It also receives radiation scattered from the signal beam by the moving particles in the fluid and scattered along the direction of the reference beam. The doppler frequency shifted radiation being scattered from the signal beam by moving particles in the fluid is heterodyned with the unshifted reference beam radiation to produce the doppler frequency photodetector output. Means are provided to detect the photodetector output frequency and translate it into velocity component information.

A second embodiment of the invention provides a second focusing element position between the first focusing element and the target that permits three dimensional translation of the system optics without readjustment or repositioning of the photodetection apparatus.

Simultaneous detection of two orthogonal velocity components is accomplished by a third embodiment of the invention. A second beam splitting means is provided to develop two reference beams. The three parallel input beams of this system are propagated parallel to the Z axis (and coincident with the lens axis) and are symmetrically displaced about the X or Y axis. The optics of this system consists basically of two one-component systems which detect velocity components at a common point P in space.

Other features and improvements of the invention are included in various beam splitting and beam refractions means which provide equal beam path lengths and beam separation and size control. Certain other novel beam splitting means permit the use of inexpensive optical components at the expense of only small performance degradation.

It is a principal object of the invention to provide a laser velocimeter having a self-aligning optical system.

It is another object of the invention to provide a new and improved velocity measuring system capable of making one or more simultaneous velocity component measurements of a moving substance without disturbance to surrounding fluid flow.

It is another object of the invention to provide a new and improved velocity measuring system capable of making one or more simultaneous velocity component measurements of a moving partially reflective solid surface.

It is another object of the invention to provide a velocity measuring system capable of making direct measurements without the need for further computation and correction factors.

It is another object of the invention to provide a velocity measuring system that is capable of instant response for the measurement of transient data.

It is another object of the invention to provide a velocity measuring system capable of measurement very close to the surface of a test object.

It is another object of the invention to provide a velocity measuring system that is indifferent to highly energetic plasma flow fields.

It is another object of the invention to provide a laser, doppler shift, velocity measuring system that does not require constant adjustment and manipulation to maintain precise interception of multiple light beams.

It is another object of the invention to provide a laser doppler shift, velocity measuring system that is substantially insensitive to vibrations and inadvertent jarring of system components.

It is another object of the invention to provide a laser doppler shift, velocity measuring system that requires minimum setup time and that can be operated by an unskilled operator.

These, together with other objects, advantages and features of the invention, will become more readily apparent from the following detailed description when taken in conjunction with the illustrated embodiment in the accompanying drawings wherein like elements are given like reference numerals throughout

DESCRIPTION OF THE DRAWINGS

FIGS. 1a 1b, 1b are schematic diagrams which illustrate the optical arrangement of this invention when used as a reference beam detector, operating in a maximum radiation collection mode, to detect one component of velocity;

FIG. 2 is a schematic diagram which illustrates a preferred embodiment of this invention when used as a one velocity component, reference beam detector operating in a maximum radiation collection mode;

FIGS. 3a through 3r are schematic diagrams which illustrate preferred embodiments of the plane-parallel block and planar wedge subcomponents of the invention when used for one velocity component detection FIGS. 4a, through 4g are schematic diagrams illustrated for the purpose of explaining how to properly position illuminating beams on the focusing element to detect two orthogonal velocity components;

FIGS. 5a and 5b are schematic diagrams which illustrates the operating principles of this invention when used in a reference beam configuration to detect two orthogonal components of velocity; and, FIGS. 6a through 6u are schematic diagrams which illustrate preferred embodiments of the plane-parallel block subcomponents for use in a two orthogonal component velocity detection system.

DETAILED DESCRIPTION OF THE PREFERRED EMBODIMENT

Referring now to FIG. 1a, plane polarized collimated light beam 1 from a quasi-monochromatic laser source 2 is directed onto a parallel surface glass block 3 such that the input beam polarization is either parallel with or perpendicular to the plane of incidence. Under such circumstances the two beams 4 and 5 emerging from the glass block 3 will be linearly polarized in a common direction and will propagate parallel to one another. (For a one-component cross-beam system to operate most efficiently, the two illuminating beams must be plane polarized in a common direction.) Parallel output beam paths will result only if the two planar working surfaces of the glass block 3 are parallel. The schematic symbol denotes two opposing plane parallel surfaces of glass block and is so used throughout the drawings. Laser beam 4 then intercepts intensity filter 6. The characteristics of intensity filter 6 are that it attenuates the transmitted radiation 7 and produces a collimated output beam 7 propagating parallel to the collimated input beam 4. An example of intensity filter 6 would be a glass block with plane parallel working surfaces and with one surface coated to reduce the transmitted intensity. Beam 7 thus propagates parallel to beams 4 and 5, and beam 7 is of variable intensity. Parallel beams 5 and 7 then intercept the focusing element 8. The characteristics of the focusing element 8 are that it transforms a set of parallel input rays (planar wavefront radiation into a converging set of output rays (spherical wavefront radiation) that focus to a common point 9. A simple example of focusing element 8 is a positive lens. Focusing element 8 thus causes parallel beams 5 and 7 to both focus and cross at a common point 9. It is known that when a square-law photodetector 11 (a simple example of which would be a photomultiplier tube) is placed in the path of the lower power beam 7 after it has passed through focus, that the frequency of the detected signal (phototube current) will vary in proportion to the y-axis (FIG. 1a) component of velocity of a semi-transparent (partically scatting) substance 10 moving through the cross point 9. Furthermore, it is also known that the y velocity component of only those scatterers near the cross point 9 will be detected even though no attempt has been made to limit the collection of scattered radiation. The light scattered from beam 5 from scatterers located remotely from the cross point 9 is collected by the photodetector 11. Such a detection system is said to operate in a maximum radiation collection mode as no attempt is made to block any portion of the reference beam 7 or any extraneous radiation scattered from beam 5. The system operates very efficiently in this manner as extraneously scattered radiations contribute negligibly small noise due to the dominance of the higher power reference beam 7. Also only those radiations scattered from beam 5 and from near the cross point 9 are sufficiently well aligned with the reference radiation 7 at the photodetector 11 to generate significant doppler signal. Instrumentation means 31 is connected to the output of the photodetector 11 for determining the frequency of the detected signal, such that velocity components can be determined.

The system described above can easily be set up and made operable after a minimum of instruction; such a quickly established system will automatically produce near maximum signal-to-noise performance and will have excellent spatial resolution. The optical components (2, 3, 6, 8, and 11) can be slightly translated or rotated (due to vibration or other disturbances) without degrading the detected signal. (The sensing surface of the photodetector is assumed to be larger than the local reference beam diameter.)

The point of interest 9 can be moved through space and the system can be made to continue to detect velocity component by simply causing reference beam 7 to intercept the sensing surface of the photodetector 11. Movement of the point of interest can be accomplished in many ways, some of which are (1) moving the focusing element 8; (2) moving components 2, 3, 6 and 8 simultaneously; (3) changing the path of radiations 5 and 7 to any desired orientation by reflecting these radiations from a series of translatable, flat mirrors. This can be done either before or after such radiations have intercepted focusing element 8; (4) translating focusing element 8 with none, one, or more of the previously mentioned translatable, flat mirrors; (5) employing a focusing component 8 of variable focal length; (6) various combinations of the above.

The parallel surface glass block component 3 can be rotated to vary the distance separating beams 5 and 7. Such variation will alter the performance of the system in a predictable manner without changing the location of the detection point 9. The system can easily be altered to produce either a very small or very large probe volume at a given measurement distance by employing (in place of focusing element 8) various combinations of focusing elements that cause the cross-sectional beam pattern (the diameters and spacing) of beams 5 and 7 to expand or contract prior to being focused.

Velocity components of a partially reflecting, partially scattering medium can also be detected using the detection scheme of FIG. 1b. In this configuration reference beam 7 is reflected from a partially reflecting, moving medium 10 and then caused to intercept the photodetector 11. It is assumed that medium 10 contains a mirror-like surface which scatters a small amount of the incident radiations but is mostly reflecting. It is also assumed that the mirror-like surface of medium 10 is located near the cross-point 9 of beams 5 and 7. It can be shown that such a scheme will also detect y-axis velocity component of the moving medium 10; even though both the reflected reference radiation from beam 7 and the superimposed scattered radiation from beam 5 are both doppler shifted due to z-axis velocity component of the moving surface, the detected doppler difference frequency is independent of such z-axis velocity component and is proportional to only the y-axis velocity component.

In FIG. 2 a more versatile receiving optics scheme is shown. Focusing element 12 directs reference beam 7 onto the photodetector 11, and does so even though reference 7 is translated to a position 7' parallel to its original position 7. Focusing element 12 will cause reference beam 7 to remain centered on the phototube 11 so long as the cross point 9 is contained within the cylindrical collection region 14. In FIG. 2 it is assumed that beams 5 and 7 (prior to intercepting lens 8) originated from an optical system similar to that of components 2, 3 and 6 in FIG. 1a. The detection optics of FIG. 2 consist of a focusing element 12 (such as a positive lens) to direct reference beam 7 onto the center of the photodetector 11. Photodetector 11 is assumed centered on the axis of focusing element 12 and placed at a distance of one focal length 13 away from focusing element 12, where distance 13 is equal to the focal length of focusing element 12. It is also assumed that the axis of focusing element 12 is parallel to the axis of the reference beam 7. For such a maximum radiation collection detection scheme (note that again no attempt is made to block extraneously scattered radiations from beam 5) the illuminating beams can be x, y, z translated (but not rotated) to establish a new cross point 9'. For each such translation the new reference beam position 7' will be such that its axial ray is parallel to the original reference beam 7 axial ray prior to intercepting focusing element 12. The stationary focusing element 12 will then cause each translated reference beam 7' to be directed toward the center of the stationary photodetector 11. Such reference beam directing optics can also be used in a system that detects velocity component of a partially reflecting medium such as that of FIG. 1b.

FIGS. 3a through 3k depict various embodiments of the glass block subcomponent of the invention which can be employed in one component detection systems. FIGS. 3a, 3b and 3c illustrate that many orientations of the input beam onto the parallel surface glass block subcomponent may be used and, furthermore, that many parallel output beam pairs exist (any of which can be used for one component detection). FIGS. 3d and 3e illustrate preferred embodiments that produce two output beams which have traveled identical optical paths. FIG. 3f illustrates an alternate choice of parallel surface glass block component which can effectively be employed. FIG. 3g illustrates that it is not essential that the input beam illuminate one of the plane parallel surfaces. FIG. 3h illustrates that there exists at least one peculiar glass block component which will render an output beam parallel to its input beam.

In FIG. 3a a glass block with two opposing plane parallel surfaces is illuminated by beam 1. Generally, there results a series of front directed parallel output beams 2, 3 and 4, and also a series of back directed parallel output beams 5, 6 and 7. The block can be coated such that, for example, only output beams 2 and 4 contain substantial power. As these beams are parallel to one another, they can be used in a one component detection scheme. Many other choices of parallel output beam pairs also exist.

The sequence of figs. 3a, 3b and 3c illustrates that as the angle of incidence $\theta_i$ of the input beam onto the glass block is increased, the separation $d_1$ of any two adjacent output beams increases to a maximum value (FIG. 3b) and then decreases as $\theta_i$ is further increased (FIG. 3c). Also, as the angle of incidence $\theta_i$ increases, the displacement $d_2$ of the first transmitted output beam 2 from the projected path 1' (of incident beam 10 continually increases as the $\theta_i$ is increased. It can be shown for most common glass materials that the output beam separation $d_1$ achieves a maximum value for $\theta_i$ approximately equal to 49° incidence. Near this particular angle of incidence the output beam separation $d_1$ is very insensitive to the variations in the angle of incidence $\theta_i$. Thus a preferred embodiment of a one component LDV employing a single block would be to illuminate the block approximately at that particular angle of incidence which causes the output beam separation $d_1$ to be a maximum (this occurs for $\theta_i = 49°$ for visible light if the index of refraction of the glass block is 1.55.) For such an illumination, the output beam separation $d_1$ would be essentially constant and insensitive to small variations of $\theta_i$. Such an orientation of the glass block component would produce a more accurate velocity measurement because doppler frequency to velocity conversion factor is determined solely by the beam separation distance $d_1$ and the focal lengths of the focusing component.

It also happens that when the output beam separation $D_1$ is a maximum (FIG. 3b), the projection 1' of the illumination beam 1 is equally spaced between the output beams 2 and 3, as shown in FIG. 3b. This fact can be used to simplify the design of a single component detection system as the laser beam axis 1 can now be coincident with the axis of the focusing element, and a symmetrical package design results. This fact will also be used to simplify the design of a two orthogonal velocity component detection scheme.

It is a common known fact with a reference beam LDV detection scheme that if the optical path lengths of the two illuminating beams (from the laser to the cross point) are not identical, the signal will be degraded as a result. The extent of signal degradation is a function of the coherence length of the laser. One velocity component preferred glass block embodiments that provide equal optical path lengths are shown in FIGS. 3d and 3e.

In FIG. 3d block B1 is illuminated by either input beam 1 or 1' and produces the two output beams 2 and 3. Due to the increased optical path in traveling through block B1, a particular phase front of output beam 3 lags the same phase front of output beam 2. Block B2 serves to re-equalized optical path lengths of the two phase fronts such that output beams 4 and 5 are in phase. In particular this is true if blocks B1 and B2 are of identical thickness and if the angle of incidence $\theta_i$ of the illuminating radiation onto each block is identical. An alternate illuminating position 2', 3' onto block B2 will again serve to equalize optical paths.

FIG. 3e is another preferred embodiment of the parallel surface block subcomponent of the invention which provides equal optical path lengths. Block B1, illuminated by either input beam 1 or 1', produces two parallel output beams 2 and 3. Note that beam 3 has experienced a triple reflection in traveling through block B1, such that the distance D separating output beams 2 and 3 is increased. Block B2 which is illuminated by input beams 2 and 3 or 2' or 3' again serves to equalize optical path lengths. Such a multi-reflection preferred embodiment can be used to advantage to obtain not only equal optical path lengths but also a larger angle between the beams as they converge to focus after passing through the focusing element subcomponent of the invention. Such a condition will produce a smaller probe volume. Note that the length of the blocks B1 and B2 of FIG. 3e can be increased even further to provide more internal reflections and even greater separation of the two output beams. Blocks B1 and B2 of FIGS. 3d and 3c can be positioned to provide maximum output beam separation. FIG. fig. 3f indicates a particular set of blocks that are somewhat different from those previously discussed, but nevertheless constitute a preferred embodiment of the parallel surface block subcomponent of the invention as such blocks use a minimum amount of glass material to achieve a given output beam separation. These particular parallel surface glass block subcomponents are also self-aligning in that they produce parallel output beams 3, 4 and 6 such that the parallelism of the output beams is not affected by small displacements or rotations of the block subcomponents. The first block 2 consists of two solid pieces ABCE and CDE of glass glued together after depositing a beam splitter coating on one of the surfaces EC prior to it being glued. Glass block ABCE, with planar surface AB parallel to planar surface CE and with planar surface AE not necessarily parallel to planar surface BC, is glued to glass block CDE (all of whose working surfaces are planar) after deposition of a partially reflecting optical coating on surface CE of either glass piece. It is assumed that the index of refraction of the two glass pieces ABCE and CDE are identical and that the glue region introduces minimum wedge refraction effects. The effects of the glue wedge angle are assumed to be minimized by either (1) choosing a glue whose refractive index is approximately equal to that of the glass material and/or (2) by placing the glued pieces in an interferometer and, while the glue is hardening, adjusting their relative position such that the interferometrically viewed wedge angle between surfaces EC is minimized, or (3) by optically contacting surfaces EC together. After gluing, the optical surface BCD is assumed polished such that it is planar. The system readily lends itself to path equalization by insertion of a second glass block component 5 which is a single piece with two sets of opposing plane parallel surfaces. It should be noted that the block 2 of FIG. 3f can be illuminated either by input beam 1 or 1'. It should be noted that in FIG. 3f the input polarization must be either parallel or perpendicular to the reflecting surfaces (AB and EC, for example) of each glass block component for the output beams 3, 4 and 5 to be identically polarized.

FIG. 3g illustrates the point that the illuminating beam 1 need not necessarily intercept one of the two plane parallel working surfaces cg and bf to produce a set of parallel output beams. The only essential feature of the parallel surface glass block subcomponent is that by some means the internal ray path ab is generated such that a series of output parallel rays results (rays 5, 6 and 7 are parallel as are rays 2, 3 and 4.)

FIG. 3h illustrates two points. First, the figure illustrates (as does FIG. 3f) that one of two parallel rays 1 and 2 can intercept one or more solid glass optical components which render a third parallel ray 3. Secondly, beams 1 and 2 could both simultaneously have intercepted the parallel surface glass block component (of FIG. 3h) and the component would have rendered (assuming both beams intercepted the same set of planar refracting and/or reflecting surfaces) both output beams parallel to one another. Generally, there exists an infinite variety of optical components similar to that of FIG. 3h and which are of a solid glass construction and which will render two or more parallel input beams. Generally when two or more parallel path beams intercept a planar reflected surface, the resulting set of reflected beams will remain parallel and also be of parallel path. Also, when two or more parallel path beams refract and/or reflect through a refractive, glass-like medium containing planar working surfaces (such as a glass wedge) the output beams will again be parallel to one another. Such techniques, which can be used to advantage for particular applications, do not alter the fact that an initial set of parallel path beams must initially be generated.

In FIG. 3i a non-parallel glass block subcomponent that will reduce the cost is indicated. The planar surfaces AB and CD (the edge views of which are shown) are not parallel but nevertheless produce an LDV with excellent performance characteristics provided the angle $\theta$ between the working surfaces is not too large and is properly oriented. Illuminating beam 1 intercepts the glass block which produces two output beams 3 and 4 which are not parallel. For proper wedge angle orientation, however, these beams will intercept lens 5, focus at points 8 and 9 and cross at point 10. The wedge angle $\theta$ must be oriented such that the plane formed by surface normals 11 and 12 is parallel to the input beam. If such is not the case, the beams 3 and 4 will not cross properly in space.

FIG. 3j illustrates another embodiment of the parallel surface, glass block component of the invention which will also be less expensive. Generally, a large piece of thick, optical quality window glass will neither have flat nor parallel surfaces. However, such glass can usually be cut to produce a usable glass block subcomponent as shown in FIG. 3j. It is assumed that the portion cut is of fairly constant thickness (i.e., that the local radii of curvature of the two working surfaces are approximately equal) and also that the plane formed by the local surface normals is again approximately parallel to the direction of the input beam.

FIG. 3k illustrates a set of optical components which can be used to advantage with the invention. Parallel input beams 1 and 2 refract through glass wedge 3 such that the parallel output beams 4 and 5 are expanded in one dimension. Not only are the beam diameters linearly increased but the beam separation is linearly increased in one dimension. It is assumed that the glass wedges 3 and 6 contain only planar working surfaces. Expanded beams 4 and 5 then intercept the glass wedge 6 which causes them to be linearly expanded in a second dimension. Output beams 7 and 8 are thus linearly expanded in two dimensions. Note that if either wedge is illuminated in reverse, a linear one-dimensional de-expansion results. When placed between the laser and the parallel surface glass block component of the invention, they can be used to expand or de-expand the laser beam in one or two dimensions. A one-dimensional expansion can be used to decrease the probe volume and increase the signal strength without increasing the frequency dispersion. When placed between the parallel surface glass block component and the focusing component of the invention they can be used to expand or de-expand the beam size and spacing of the two beams in one or two dimensions. A two-dimensional expansion or de-expansion can be used to decrease or increase the probe volume without increasing the frequency dispersion. It is assumed that the orientation of the polarization onto the glass wedges of FIG. 3k is such that the input beam polarization is either approximately parallel or perpendicular to the plane of incidence such that plane polarized output beam result.

FIG. 4a indicates the means by which two orthoganal components of velocity can simultaneously be detected at a common point. The figure contains three orthogonal views of a lens L1 illuminated by three parallel input beams. For beams 1 and 2 to detect y velocity component (or for beams 3 and 2 to detect x velocity component) the particular beam pair must not only propagate parallel to the z axis (which is assumed coincident with the lens axis) but must also be symmetrically displaced about the x axis (or about the y axis). For such a condition, the three input beams will project a right triangle pattern onto the x-y plane prior to intercepting focusing element L1 such that the hypotenuse A of the right triangle is bisected by the axis of the focusing element. Thus, beams 1 and 2 can be x-y translated and will continue to detect y velocity component so long as they remain parallel to the z axis (the focusing element axis) and remain equally spaced above and below the x axis. Similarly, beams 2 and 3 must be equally spaced about the y axis to detect only x velocity component. FIGS. 4b and 4c indicate a number of positions of the three illuminating beams onto the focusing element L1 that can be used to detect two orthogonal velocity components.

FIG. 4c is the beam pattern produced by the blocks of FIG. 5 for detecting x and y velocity components.

FIG. 5 is a schematic diagram which indicates how two orthogonal components of velocity can be detected simultaneously at a common point P in space. The optics consist basically of two separate one-component systems which detect velocity components at a common point P in space. Spatial coincidence will be automatically ensured even though one or more of the optical components are rotated or vibrated due to mechanical disturbances. Such movement will cause the probe region P to move slightly in space but will not cause loss or deterioration of signal.

A more complete description of FIG. 5 will now be presented. Polarized laser beam 1 emitted from laser L illuminates block B1 with polarization either parallel or perpendicular to the plane of incidence. Output beam 2 passes over block B2 while output beam 3 passes through an intensity filter F1 prior to intercepting block B2. Output beams 2 and 3 are plane polarized identical to beam 1 and to each other; they are also parallel to beam 1. Beam 3 then intercepts block B2 either parallel or perpendicular to the plane of incidence and generates output beams 4 and 5 which pass through intensity filters F3 and F2, respectively, such that beams 2, 4 and 5 are similarly plane polarized and are parallel prior to intercepting focusing element L1. It is assumed that the blocks are coated such that beam 2 contains substantially more power than beams 4 or 5; beam 2 is employed as an illuminating beam, and beams 4 and 5 are used as reference beams. Beams 2, 4 and 5 are then caused to focus and cross at a common point P in space. Detection optics are established such that reference beams 5 and 4 intercept lenses L2 and L3, respectively, prior to intercepting photodetectors P1 and P2, respectively. It is assumed that focusing elements L2 and L3 and the photodetectors are positioned such that they will cause the reference beams to remain centered on the photodetectors when the illuminating radiations are translated (as previously discussed with the one component system). The detection point P can be translated throughout the three-dimensional volume formed by the intersection of the cylindrical collection regions C1 and C2, and the stationary detector optics (L2, L3, P1, P2) will cause both reference beams to remain centered on their respective photodetectors. The advantages of this two-component, self-aligning, reference beam LDV system in comparison to similar but not self-aligning systems include all the previously mentioned advantages of the one-component self-aligning optical system. The probe region can be translated through space due to a series of reflections from planar mirror surfaces as discussed previously for the one-component reference beam system.

FIGS. 6a through 6g show various glass block subcomponents which generate three or more parallel output beams such that the output beam pattern forms a right triangle. All of the particular embodiments of FIG. 6 can be used in a two orthogonal component velocity detection scheme similar to those previously discussed. In FIGS. 6a through 6e the polarization is assumed to be either parallel or perpendicular to the plane of incidence of the illuminating radiation onto the initial glass block component, such that the polarizations of the three or more output beams are linearly polarized in a common direction. The output beams of FIG. 6f cannot be linearly polarized in a common direction resulting in a lower efficiency detection system. In FIG. 6g (which employs blocks similar to those of FIG. 3f) it is assumed that the illuminating polarization of each block is located either parallel or perpendicular to the reflecting surface of the particular block. In FIGS. 6a and 6b all of the output beams have travelled identical optical paths. Such block schemes are highly efficient but rather expensive due to the large size and number of glass blocks required. In many applications the coherence length of the laser is large enough to justify the use of less expensive blocks which are not path length compensated. Such blocks are indicated in FIGS. 6c, 6d and 6e. The geometry of FIG. 6d is relatively simple and, therefore, inexpensive.

The block design of FIG. 6e is advantageous not only because all the blocks are identical (to reduce cost) but the path lengths are compensated in that they are almost (but not identically) equal.

The blocks of FIG. 6f are probably the least expensive that can be produced for a two-component system. They are of identical size and only two are required. However, they are not path length compensated and they cannot be illuminated such that the polarization plane is parallel or perpendicular to the plane of incidence of both blocks. Such a condition will cause output beams 6 and 7 to be elliptically polarized or to be plane polarized in a direction different from that of beams 3 and 4.

The blocks of FIG. 6g are similar to those of FIG. 3f. They are approximately path length compensated.

In describing the embodiments of the invention illustrated in the drawings, specific terminology has been resorted to for the sake of clarity. However, invention is not intended to be limited to the specific terms so selected, and it is to be understood that each specific term included all technical equivalents which operate in a similar manner to accomplish a similar purpose.

It is not therefore desired that the invention be limited to the specific arrangements shown and described and it is intended to cover in the appended claims all such modifications that fall within the true spirit and scope of the invention.

What is claimed is:

1. A laser doppler shift two velocity component measuring system comprising means for providing a plane polarized collimated input light beam,
   means for splitting said input light beam into first and second plane polarized parallel light beams,
   means for limiting the intensity of said first plane polarized light beam,
   means for splitting said intensity limited light beam into first and second plane polarized parallel reference light beams, said reference light beam being parallel to and in orthogonal relationship with said second plane polarized light beam,
   means for limiting the intensity of said first and second reference light beam,
   means for causing said first and second intensity limited reference beams and said second plane polarized light beam to converge and focus at a common point,
   a first photodetector means positioned proximate to and beyond said common point and oriented to receive said first reference beam, and
   a second photodetector means positioned proximate to and beyond said common point and oriented to receive said second reference beam.

2. A laser doppler shift two velocity component measuring system as defined in claim 1 including a positive lens positioned between said common point and each said photodetector means.

3. A laser doppler shift two velocity component measuring system as defined in claim 2 wherein said means for splitting said input light beam into first and second plane polarized parallel light beams and said means for splitting said intensity limited light beam into first and second plane polarized parallel reference light beams comprise parallel surface glass blocks having spatial relationships and orientation adapted to generate at least three parallel output beams having an output beam pattern that forms a right triangle.

* * * * *